United States Patent
Nakamura

(10) Patent No.: US 7,803,486 B2
(45) Date of Patent: Sep. 28, 2010

(54) POWER STORAGE DEVICE

(75) Inventor: Yoshiyuki Nakamura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 64 days.

(21) Appl. No.: 12/085,024

(22) PCT Filed: Oct. 29, 2007

(86) PCT No.: PCT/JP2007/071015
§ 371 (c)(1),
(2), (4) Date: May 14, 2008

(87) PCT Pub. No.: WO2008/053830
PCT Pub. Date: May 8, 2008

(65) Prior Publication Data
US 2009/0269665 A1 Oct. 29, 2009

(30) Foreign Application Priority Data
Nov. 2, 2006 (JP) .............................. 2006-299589

(51) Int. Cl.
*H01M 4/02* (2006.01)
*H01M 6/18* (2006.01)

(52) U.S. Cl. ...................................... 429/304; 429/188

(58) Field of Classification Search .............. 429/209, 429/309, 317
See application file for complete search history.

(56) References Cited

U.S. PATENT DOCUMENTS

| 2003/0157399 A1* | 8/2003 | Ikeuchi et al. .................. 429/62 |
| 2004/0118579 A1* | 6/2004 | McCutcheon et al. ...... 174/16.3 |
| 2005/0019666 A1 | 1/2005 | Yasuda |
| 2005/0079419 A1* | 4/2005 | Jan et al. ................ 429/231.95 |

FOREIGN PATENT DOCUMENTS

| EP | 1 041 657 A2 | 10/2000 |
| JP | 08-255615 A | 10/1996 |
| JP | 2001243974 A * | 9/2001 |
| JP | 2004-178914 A | 6/2004 |
| JP | 2005-011660 A | 1/2005 |
| JP | 2005-044663 A | 2/2005 |

OTHER PUBLICATIONS http://web.archive.org/web/20061025194107/http://www.firstrays.com/particle_packing.htm.*

* cited by examiner

*Primary Examiner*—Jennifer K Michener
*Assistant Examiner*—Eli S Mekhlin
(74) *Attorney, Agent, or Firm*—Kenyon & Kenyon LLP

(57) ABSTRACT

The invention provides a power storage device capable of preventing reduced energy efficiency of the power storage device and of avoiding variations in temperature distribution. The power storage device includes a positive electrode and a negative electrode, and a solid electrolyte layer placed between the positive electrode and the negative electrode and including a group of particles, wherein the density of particles in a first area of the solid electrolyte layer is lower than the density of particles in a second area which has higher heat radiation than the first area.

11 Claims, 7 Drawing Sheets

POWER STORAGE DEVICE

This is a 371 national phase application of PCT/JP2007/071015 filed 29 Oct. 2007, claiming priority to Japanese Patent Application No. 2006-299589 filed 2 Nov. 2006, the contents of which are incorporated herein by reference.

TECHNICAL FIELD

The present invention relates to a power storage device such as a secondary battery having a solid electrolyte layer.

BACKGROUND ART

Secondary batteries are widely used as a power source of a portable electronic device such as a notebook computer and a cellular phone and also used as a power source of an electric vehicle. Various proposals have been made for reducing degradation of battery performance associated with a temperature change (for example, see Patent Documents 1 and 2).

In a secondary battery electrode described in Patent Document 1, a plurality of minute cells are formed as electrode layers on a collector serving as a substrate in order to relieve thermal stress produced from a temperature change within the secondary battery.

In the secondary battery electrode described in Patent Document 1, the plurality of minute cells formed on the collector include different amounts of conductive agent to provide uniform temperature distribution on the secondary battery electrode. Specifically, a minute cell located at the center of the collector contains the smallest amount of conductive agent, while a minute cell located at the end of the collector contains the largest amount of conductive agent.

[Patent Document 1] Japanese Patent Laid-Open No. 2005-11660 (FIGS. 1, 2, 11 and the like)

[Patent Document 2] Japanese Patent Laid-Open No. 2004-178914

DISCLOSURE OF THE INVENTION

Problems to be Solved by the Invention

In the secondary battery electrode described in Patent Document 1, however, the minute cells are formed in some areas on the surface of the collector but are not formed in other areas. Such a configuration reduces the energy efficiency of the secondary battery since no electric current flows in the area in which the minute cells are not formed.

To overcome the problem, it is a main object of the present invention to provide a power storage device capable of preventing reduced energy efficiency of the power storage device and of avoiding variations in temperature distribution.

Means for Solving Problems

According to an aspect, the present invention provides a power storage device including a positive electrode and a negative electrode, and a solid electrolyte layer placed between the positive electrode and the negative electrode and including a group of particles, wherein the density of particles in a first area of the solid electrolyte layer is lower than the density of particles in a second area which has higher heat radiation than the first area.

The average diameter of the particles in the first area can be larger than the average diameter of the particles in the second area. In other words, the diameter of the particles located in the first area can be larger than the diameter of the particles located in the second area.

If the solid electrolyte layer contains a bounding agent for bonding the particle group, the amount of the bounding agent in the first area can be larger than the amount of the bonding agent in the second area. In this case, the average diameter of the particles in the first area can be generally equal to the average diameter of the particles in the second area.

The first area can be an area located on the central portion side of the solid electrolyte layer, and the second area can be an area located closer to an end portion than the first area. If thermal effects from the outside of the power storage device reduce heat radiation, for example in an area of the solid electrolyte layer that is at or near an end portion thereof, the density of the particles in the area can be lower than the density of the particles in the other areas.

The density of the particles can be reduced from the end position to the central portion of the solid electrolyte layer continuously or stepwise.

In a power storage device including a positive electrode and a negative electrode, and a solid electrolyte layer placed between the positive electrode and the negative electrode and including a group of particles, wherein the thickness of a first area of the solid electrolyte layer can be larger than the thickness of a second area which has higher heat radiation than the first area. The thickness of the solid electrolyte layer can be varied continuously or stepwise.

In this case, the thickness of the positive electrode and the negative electrode in contact with the solid electrolyte layer can be varied. Specifically, each of a positive electrode layer (containing a positive electrode active material) included in the positive electrode and a negative electrode layer (containing a negative electrode active material) included in the negative electrode can have a varying thickness in accordance with the thickness of the solid electrolyte layer. This can provide generally uniform interval between the positive electrode and the negative electrode.

In a power storage device including a positive electrode and a negative electrode, and a solid electrolyte layer placed between the positive electrode and the negative electrode and including a group of particles, wherein the material of the particles in a first area of the solid electrolyte layer can be different from the material of the particles in a second area which has higher heat radiation than the first area such that the resistance value in the first area is higher than the resistance value in the second area. The different materials can be used for the particle group to vary the resistance value in the solid electrolyte layer continuously or stepwise.

When the different materials are used for the particle group, different materials of the particles are used for each of the first area and the second area, or a plurality of materials are used and mixed at varying ratios.

When a plurality of solid electrolyte layers are stacked such that it is sandwiched between the positive electrode and the negative electrode, the density of the particle group can be varied in the corresponding areas in the stacking direction across the solid electrolyte layers. Specifically, the density of the particle group in a solid electrolyte layer located on an outer layer side can be lower than the density of the particle group in a solid electrolyte layer located on the central layer side.

When the plurality of solid electrolyte layers are stacked, the solid electrolyte layers can have different thicknesses or the solid electrolyte layers can include the particle group formed of different materials as described above, instead of the varying density of the particle group.

EFFECTS OF THE INVENTION

According to the present invention, the varying density of the particle group in the solid electrolyte layer can vary the current density in the power storage device to prevent variations in temperature distribution in the power storage device.

In addition, since the varying density of the particle group in the solid electrolyte layer avoids variations in temperature distribution, it is not necessary to provide the positive electrode and the negative electrode with any areas in which the electrode layer is not formed as in Patent Document 1. This can prevent a reduction in energy efficiency of the power storage device.

BEST MODE FOR CARRYING OUT THE INVENTION

Preferred embodiments of the present invention will hereinafter be described.

Embodiment 1

Figure 1:
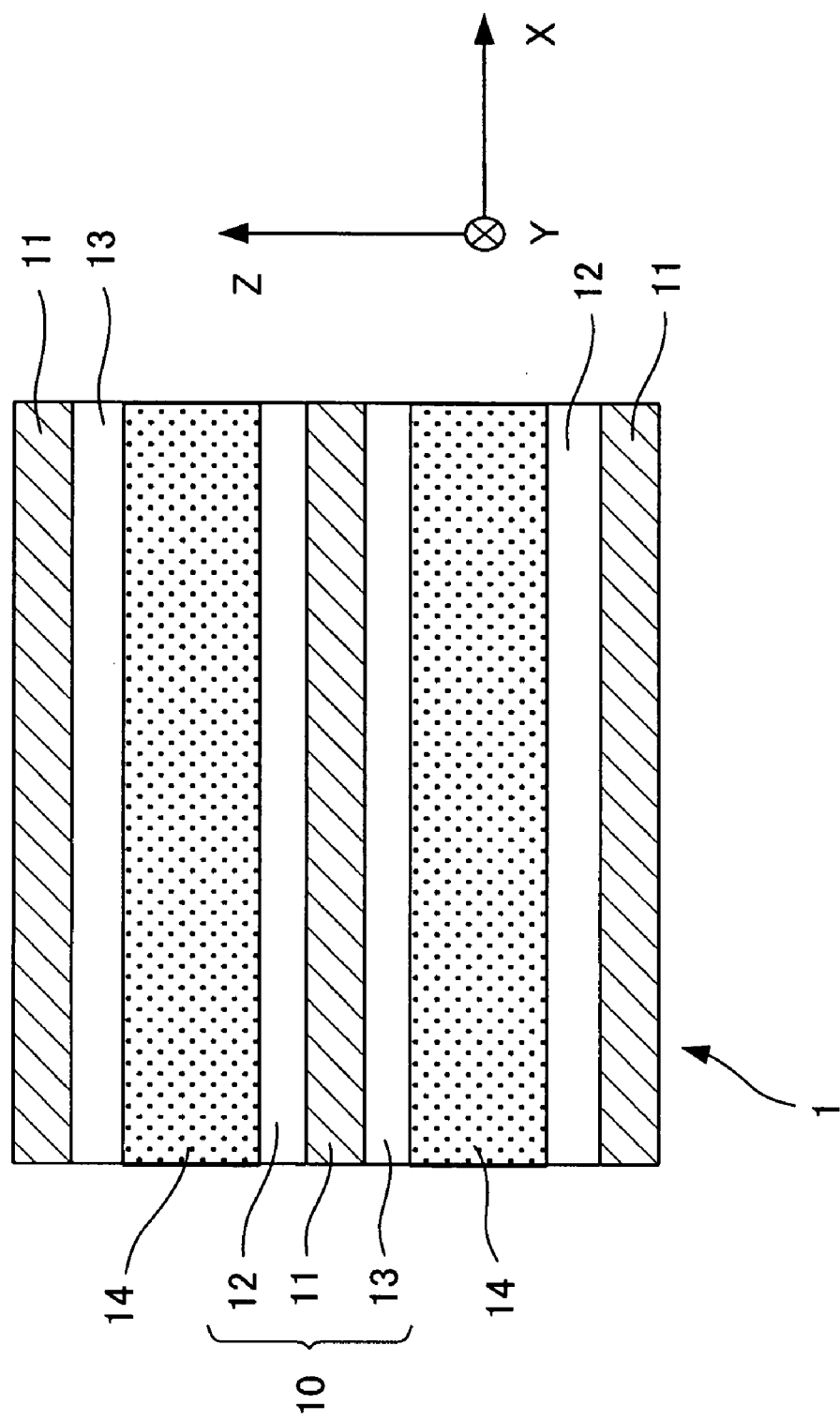
FIG. 1 A side view of (part of) a bipolar battery which is Embodiment 1 of the present invention.
Figure 2:
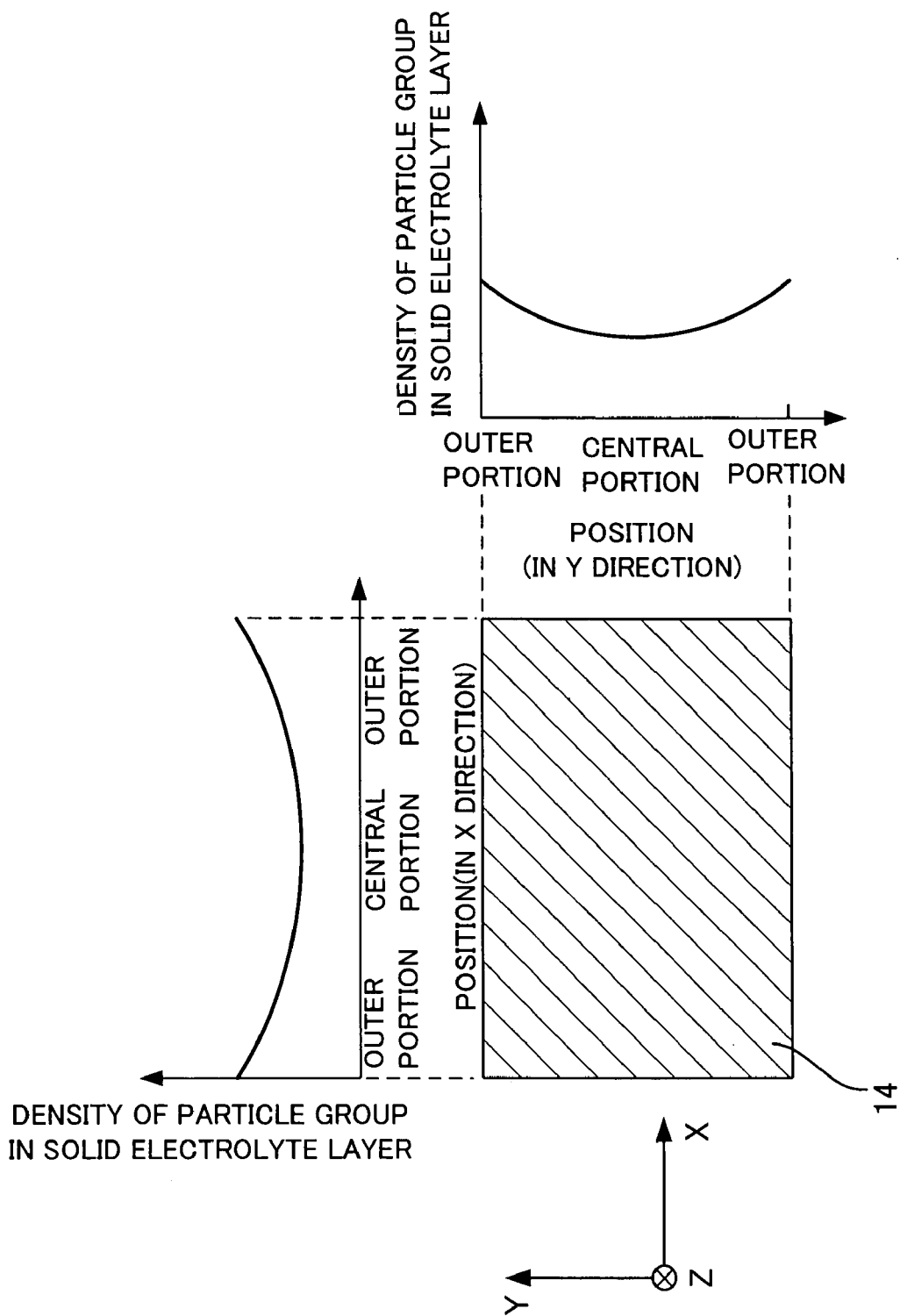
FIG. 2 A front view of a solid electrolyte layer for use in the bipolar battery of Embodiment 1 and graphs showing the relationship between the position on the solid electrolyte layer and the density of a group of particles constituting the solid electrolyte layer.

A bipolar battery (secondary battery) serving as a power storage device which is Embodiment 1 of the present invention will be described with reference to FIGS. 1 and 2. FIG. 1 is a side view of (part of) the bipolar battery of Embodiment 1. FIG. 2 shows a front view of a solid electrolyte layer for use in the bipolar battery of Embodiment 1 and also shows the relationship between the position on the solid electrolyte layer and the density of a group of particles constituting the solid electrolyte layer.

As shown in FIG. 1, the bipolar battery 1 of Embodiment 1 has a structure formed by stacking a plurality of bipolar electrodes 10 with solid electrolyte layers 14 inserted between them.

While Embodiment 1 is described in conjunction with the bipolar secondary battery 1, the present invention is applicable to another secondary battery other than the bipolar type. A secondary battery other than the bipolar type may utilize an electrode having the same type of electrode layer (positive electrode layer or negative electrode layer) formed on both sides of a collector or an electrode having an electrode layer only on one side of a collector.

While the secondary battery is described below in Embodiment 1, the present invention is applicable to a stacked capacitor (electric double layer capacitor) serving as a power storage device.

In FIG. 1, the bipolar electrode 10 has a collector 11 serving as a substrate and has a positive electrode layer 12 formed on one surface (X-Y plane) of the collector 11. A negative electrode layer 13 is formed on the other surface of the collector 11.

The collector 11 can be formed of, for example, aluminum foil or a plurality of types of metal (alloy). The collector 11 can also be provided by covering a surface of metal with aluminum.

The collector 11 can be formed of a so-called composite collector consisting of a plurality of bonded metal foil sheets. When the composite collector is used, a positive electrode collector may be made of aluminum or the like and a negative electrode collector may be made of nickel or copper. The composite collector can include a positive electrode collector and a negative electrode collector in direct contact with each other or can include a conductive layer between a positive electrode collector and a negative electrode collector.

Each of the electrode layers 12 and 13 contains an active material appropriate for the positive electrode or negative electrode. Each of the electrode layers 12 and 13 may include conductive agent, a binder, a polyelectrolyte gel for increasing ionic conduction, a polyelectrolyte, and an additive as required. Known materials can be used for forming the electrode layers 12 and 13.

For a nickel metal hydride (NiMH) battery, by way of example, a nickel oxide can be used as the active material of the positive electrode layer 12, while a hydrogen-absorbing alloy such as $MmNi_{(5-x-y-z)}Al_xMn_yCo_z$ (Mm: misch metal) can be used as the active material of the negative electrode layer 13. For a lithium secondary battery, a lithium transition metal composite oxide can be used as the active material of the positive electrode layer 12, while carbon can be used as the active material of the negative electrode layer 13. As the conductive agent, acetylene black, carbon black, graphite, carbon fiber, and carbon nanotube can be used.

Each of the electrode layers 12 and 13 can be formed on the collector 11 by using an ink-jet method, for example.

Each of the solid electrolyte layers 14 is placed between two bipolar electrodes 10. Specifically, it is sandwiched between the positive electrode layer 12 of one bipolar electrode 10 and the negative electrode layer 13 of the other bipolar electrode 10. The solid electrolyte layer 14 has a generally uniform thickness (including some manufacture errors).

The solid electrolyte layer 14 includes a group of particles formed of a plurality of particles and a binding agent for binding the particles. An inorganic solid electrolyte or a polymer solid electrolyte can be used as the solid electrolyte layer 14.

For example, a nitride of Li, a halide, oxysalt, and a phosphorus sulfide compound can be used as the inorganic solid electrolyte. More specifically, $Li_3N$, $LiI$, $Li_3N$—$LiI$—$LiOH$, $LiSiO_4$, $LiSiO_4$—$LiI$—$LiOH$, $Li_3PO_4$—$Li_4SiO_4$, $Li_2SiS_3$, $Li_2O$—$B_2O_3$, $Li_2O_2$—$SiO_2$, $Li_2S$—$GeS_4$, $Li_2S$—$P_2S_5$, $LiI$—$Li_2S$—$P_2S_5$ can be used.

As the polymer solid electrolyte, it is possible to use a material made of the electrolyte as described above and a polymer for ionization of the electrolyte or a material including a polymer having an ionizing group, for example. As the polymer for ionization of the electrolyte, it is possible to use a polyethylene oxide derivative and a polymer containing the derivative, or a polypropylene oxide derivative and a polymer containing the derivative, or a phosphoester polymer, for example. The inorganic solid electrolyte and the polymer solid electrolyte may be used in combination.

When a sulfide is used as the material forming the solid electrolyte layer 14 in the lithium secondary batter, the conductivity of lithium ion can be improved. Examples of the sulfide may include lithium sulfide and silicon sulfide.

In Embodiment 1, as shown in FIG. 2, the particle group in the solid electrolyte layer 14 has a density (volume of the particles per unit volume) which is the lowest at the center and is increased continuously toward an outer portion in each of an X direction and a Y direction. The particles contained in the solid electrolyte layer 14 are made of the same material.

Specifically, for providing the particle group at the varying density in the solid electrolyte layer 14, the particle constituting the solid electrolyte layer 14 may have different average diameters. In this case, the average diameter of the particles placed on the central portion side of the solid electrolyte layer 14 may be larger than the average diameter of the particles placed on the outer portion side. In other words, the diameter of the particles on the central portion side may be larger than the diameter of the particles on the outer portion side.

A plurality of groups of particles having different average diameters may be prepared and mixed at continuously changing ratios to provide the particle group in the solid electrolyte layer 14 at the continuously changing density as shown in FIG. 2.

Alternatively, the particle group in the solid electrolyte layer may have the varying density by using a group of particles having generally uniform diameters (in other words, a group of particles having a specific average diameter) throughout the solid electrolyte layer and by varying the amount of bounding agent included in the solid electrolyte layer 14. In this case, the amount of bounding agent contained on the central portion side of the solid electrolyte layer may be larger than the amount of bounding agent contained on the outer portion side.

Specifically, the amount of bounding agent contained in the particle group can be continuously varied in manufacture of the solid electrolyte layer 14 to provide the particle group in the solid electrolyte layer 14 at the continuously changing density as shown in FIG. 2.

It is also possible to prepare the particles having different diameters and to contain the bounding agent in the varying amount in accordance with the position in the solid electrolyte layer 14.

In Embodiment 1, the density of the particle group in the solid electrolyte layer 14 can be set on the basis of temperature distribution in a conventional bipolar battery. The conventional bipolar battery includes a solid electrolyte layer having a generally uniform thickness and containing a group of particles of a generally uniform density.

Figure 3:
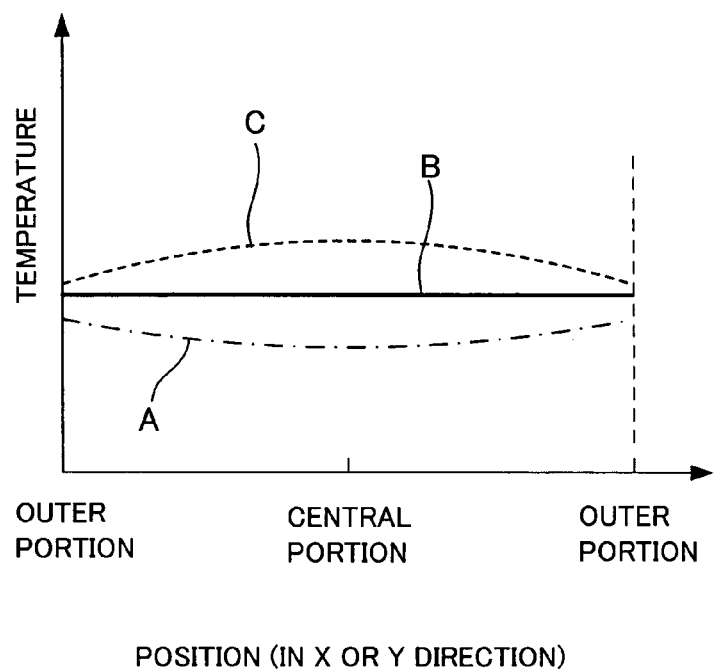
FIG. 3 A graph showing the relationship between the position in an X direction of the bipolar battery (unit cell) and temperature.

FIG. 3 shows the relationship between the position in the bipolar battery 1 (unit cell) in the X direction and temperature. In FIG. 3, the vertical axis represents the temperature in the unit cell, while the horizontal axis represents the position in the X direction (or the Y direction). The unit cell refers to a power generation element formed of the two adjacent bipolar electrodes 10 in a stacking direction (Z direction) and the solid electrolyte layer 14 placed between those bipolar electrodes 10.

In FIG. 3, a dotted line shows a temperature distribution curve C when the conventional bipolar battery (unit cell) is used. As shown by the temperature distribution curve C, the temperature is the highest at the center of the bipolar battery and is reduced toward an outer portion. Since heat tends to be held and thus heat transfer (heat radiation) suffers at the center of the battery, the temperature is higher at the center than in the other areas.

The variations in temperature distribution within the X-Y plane (in other words, the stacking plane) as shown by the temperature distribution curve C readily degrade the performance of the bipolar battery.

To address this, in Embodiment 1, the particle group in the solid electrolyte layer 14 has the density which varies depending on the position in the X-Y plane as described above. Specifically, the density of the particles on the central portion side is lower than the density of the particles on the outer portion side.

The solid electrolyte layer 14 thus formed can reduce the current density in the portion (on the central portion side) which contains the particles at the lower density, thereby reducing heat production resulting from charge and discharge of the bipolar battery 1.

When the average diameter of the particles on the central portion side is larger than the average diameter of the particles on the outer portion side, the area of contact between the particles is smaller on the central portion side to limit the moving path of ions (lithium ions in the lithium secondary battery, for example) to reduce the current value. Since the density of the particle group in the solid electrolyte layer 14 is lower on the central portion side, the resistance in the solid electrolyte layer 14 is higher on the central portion side.

On the other hand, when the amount of bounding agent on the central portion side is larger than the amount of bounding agent on the outer portion side, the area of contact between the particles is smaller on the central portion side to limit the moving path of ions and thus to reduce the current value. Since the density of the particle group in the solid electrolyte layer 14 is lower on the central portion side, the resistance in the solid electrolyte layer 14 is higher on the central portion side.

Energy consumed as heat is generally proportional to the square of the current and the value of resistance, so that the energy largely depends on the current value. As described above, the solid electrolyte layer 14 of Embodiment 1 has the configuration in which the current value is lower and the resistance value is higher on the central portion side. Thus, heat production can be reduced efficiently in the portion with the smaller current value, in other words, on the central portion side of the solid electrolyte layer 14.

The heat production on the central portion side can be reduced in this manner to prevent variations in temperature distribution in the X-Y plane of the bipolar battery 1.

In the bipolar battery 1 of Embodiment 1, the temperature distribution curve is given by a curve A of a dash dotted line in FIG. 3 in an initial operation stage. This is because the temperature on the central portion side of the solid electrolyte layer 14 is lower than the temperature on the outer portion side in the initial operation stage due to the density of the particles on the central portion side lower than the density of the particles on the outer portion side.

With changes over time, however, the temperature distribution curve of the bipolar battery 1 in the X-Y plane changes from the curve A of the dash dotted line to a curve B shown by a solid line.

This is because the temperature at the center of the bipolar battery (unit cell) is gradually increased due to lower heat radiation at the center than in the other portions. The density of the particles at the center is previously set by taking account of that temperature rise, which can achieve the generally uniform temperature distribution in the X-Y plane of the bipolar battery 1 (unit cell) as shown by the temperature distribution curve B. When the bipolar battery 1 of Embodiment 1 is put into practical use, it is preferably used after the temperature distribution curve reaches the curve B shown by the solid line in FIG. 3.

Figure 4:
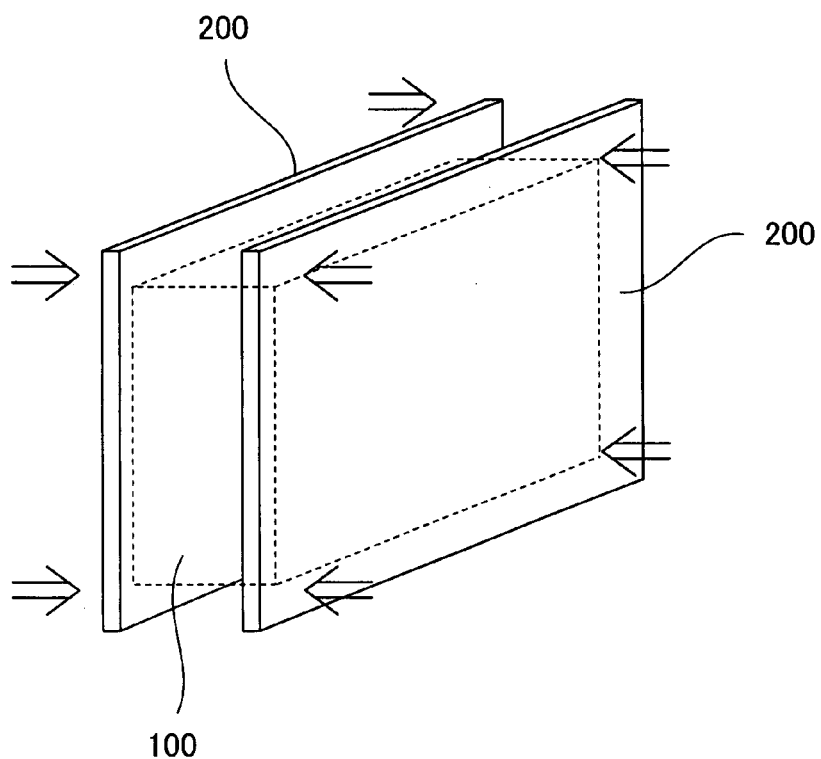
FIG. 4 A schematic diagram showing the structure for sandwiching a battery unit.

Mainly for reducing the thermal expansion of the bipolar battery 1 of Embodiment 1, a battery unit 100 constituted by stacked bipolar batteries 1 (unit cells) is sandwiched on both sides (in the stacking direction) between sandwich members 200 as shown in FIG. 4. Specifically, as shown by arrows in FIG. 4, the battery unit 100 is held in outer portions.

While the thermal expansion on the outer portion sides of the battery unit 100 can be reduced in this structure, the thermal expansion on the center side cannot be prevented. This may cause displacement only at or near the center due to the thermal expansion.

The bipolar battery 1 of Embodiment 1 can be used to avoid variations in temperature distribution in the X-Y plane, so that the thermal expansion on the center side can be reduced. Even when the structure shown in FIG. 4 is used, it is possible to prevent displacement only at or near the center of the battery unit 100 due to the thermal expansion.

In addition, since the solid electrolyte layer 14 and the electrode layers 12 and 13 have the generally uniform thicknesses in Embodiment 1, the sandwich members 200 can apply a generally uniform pressure to the entire surface of the bipolar battery 1.

Since the electrode layers 12 and 13 are provided on the substantially entire surface of the collector 11 in Embodiment 1, the electrode layers 12 and 13 can be more easily formed on the collector 11 as compared with the case where the plurality of minute cells (electrode layers) are formed on the collector as in the secondary battery described in Patent Document 1. In addition, the electrode layers 12 and 13 can be prevented from coming off the collector 11.

In the secondary battery described in Patent Document 1, the area of each minute cell significantly smaller than the area of the collector causes the minute cell to come off the collector easily during the manufacture process of the secondary battery electrode or during the placement of the secondary battery including the secondary battery electrode. When the plurality of minute cells are formed on the collector, the secondary battery electrode can be easily bent but the minute cell tends to come off the surface of the collector due to the stress in bending the secondary battery electrode.

In Embodiment 1, the electrode layers 12 and 13 formed on the substantially entire surface of the collector 11 can increase the effective area which can be used as the electrode as compared with the case where the electrode layer is not formed in some areas as in Patent Document 1. The configuration of Embodiment 1 can result in improved energy efficiency of the bipolar battery 1.

While the density of the particle group in the solid electrolyte layer 14 is continuously varied in the X direction and the Y direction in Embodiment 1 as shown in FIG. 2, the density of the particle group in the solid electrolyte layer 14 may be varied in one of the X direction and the Y direction. In this case, variations in temperature distribution can be reduced in the direction in which the density of the particle group in the solid electrolyte layer 14 is varied.

While Embodiment 1 has been described in conjunction with the electrode layers 12 and 13 formed over the entire surface of the collector 11, the electrode layers may not be formed in some areas on the collector 11. The modification will be described in detail with reference to FIGS. 5 and 6.

Figure 5:
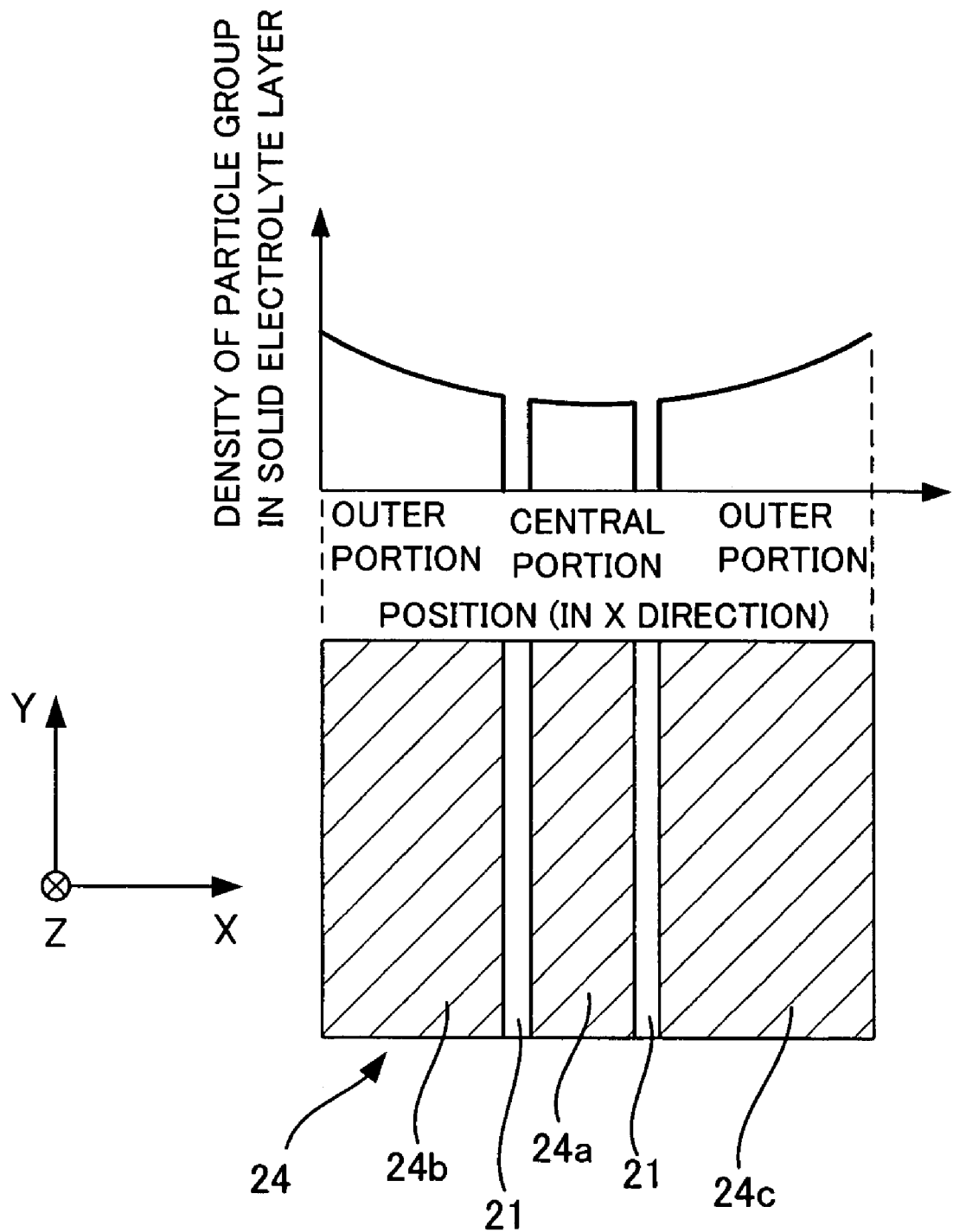
FIG. 5 A front view of a solid electrolyte layer for use in a bipolar battery which is a modification of Embodiment 1 and graphs showing the relationship between the position on the solid electrolyte layer (position in an X direction) and the density of a group of particles in the solid electrolyte layer.
Figure 6:
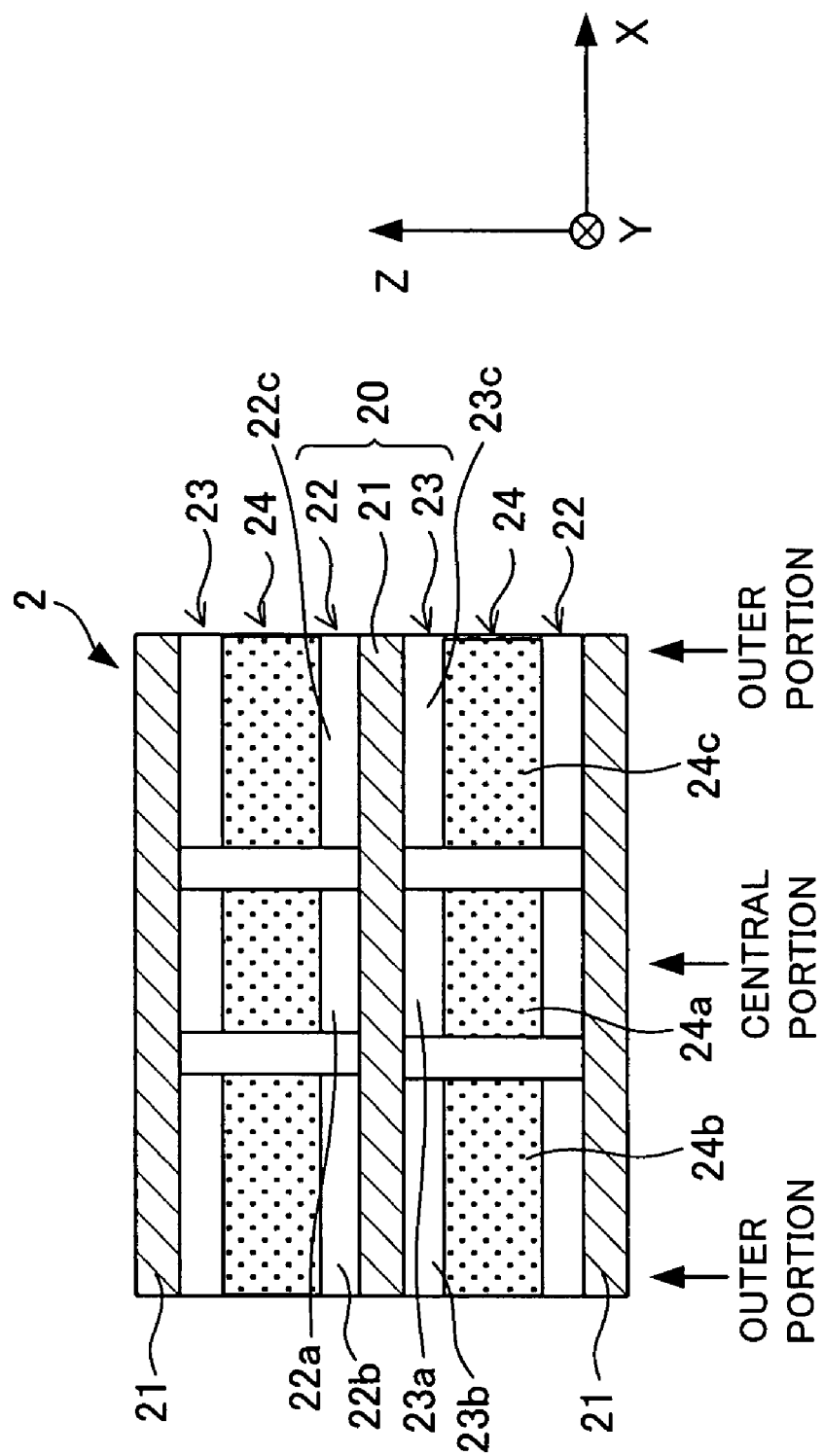
FIG. 6 A side view of (part of) the bipolar battery which is the modification of Embodiment 1.

FIG. 5 is a front view of a solid electrolyte layer for use in a bipolar battery which is the modification of Embodiment 1 and shows the relationship between the position (position in an X direction) on the solid electrolyte layer and the density of a group of particles in the solid electrolyte layer. FIG. 6 is a side view of (part of) the bipolar battery which is the modification.

As shown in FIG. 6, a positive electrode layer 22 and a negative electrode layer 23 are formed on opposite surfaces of a collector 21. Each of the positive electrode layer 22 and the negative electrode layer 23 is formed of three layers as described below.

On one surface of the collector 21, a first positive electrode layer 22a located at the central portion thereof is formed, and a second positive electrode layer 22b and a third positive electrode layer 22c located on both sides of the first positive electrode layer 22a in the X direction are formed. There are areas in which none of the positive electrode layers 22a to 22c is formed between the positive electrode layers 22a to 22c adjacent to each other in the X direction in FIG. 6. The positive electrode layers 22a to 22c are made of the same material.

On the other surface of the collector 21, a first negative electrode layer 23a located at the central portion thereof is formed, and a second negative electrode layer 23b and a third negative electrode layer 23c located on both sides of the first negative electrode layer 23a in the X direction are formed. There are areas in which none of the negative electrode layers 23a to 23c is formed between the negative electrode layers 23a to 23c adjacent to each other in the X direction in FIG. 6. The negative electrode layers 23a to 23c are made of the same material.

A solid electrolyte layer 24 is formed in areas corresponding to the areas in which the electrode layers 22 and 23 are formed. The solid electrode layer 24 has a first solid electrolyte layer 24a located between the first positive electrode layer 22a and the first negative electrode layer 23a, a second solid electrolyte layer 24b located between the second positive electrode layer 22b and the second negative electrode layer 23b, and a third solid electrolyte layer 24c located between the third positive electrode layer 22c and the third negative electrode layer 23c.

As shown in FIG. 5, the first solid electrolyte layer 24a includes the particle group having a density which is the lowest at the center in the X direction and is continuously increased toward an outer portion (closer to the second solid electrolyte layer 24b or the third solid electrolyte layer 24c). Each of the second solid electrolyte layer 24b and the third solid electrolyte layer 24c includes the particle group having a density which is the lowest at the position closest to the center (closest to the first solid electrolyte layer 24a) and is continuously increased toward an outer portion.

The area (space) in which the electrode layer 22 or 23 or the solid electrolyte layer 24 is not formed on the collector 21 can be provided in the modification and used to radiate the heat produced within the bipolar battery 2 outside. Especially, since the temperature is the highest at or near the center of the bipolar battery 2, the area in which the electrode layer 22 or 23 is not formed can be provided at or near the center to radiate the heat within the bipolar battery 2 efficiently.

In addition, since each of the solid electrolyte layers 24a to 24c includes the particle group at the varying density depending on the position in the X direction, variations in temperature distribution in the X direction can be avoided.

While the solid electrolyte layer 24 is formed corresponding to the areas in which the electrode layers 22 and 23 are formed in the modification, the solid electrolyte layer 24 may be formed as a single component as in Embodiment 1 (see FIG. 1). Such a configuration can prevent collectors 21 adjacent in the stacking direction from coming into contact with each other and then being short-circuited.

While the modification has been described for the case where the two areas are provided in which the electrode layer 22, 23 or the like is not formed, the present invention is not limited thereto and the number of the areas in which the electrode layer 22, 23 or the like is not formed can be set as appropriate. As the number of the areas in which the electrode layer 22 or 23 is not formed is increased, the energy efficiency of the bipolar battery 2 is reduced. It is thus preferable to provide the fewest possible areas in which the electrode layer 22 or 23 is not formed.

The modification includes the areas in which the electrode layer 22 or 23 is not formed, but the areas in which the electrode layer is not formed is smaller than those areas in the secondary battery described in Patent Document 1, thereby preventing an extreme reduction in energy efficiency of the bipolar battery.

While Embodiment 1 and the modification have been described in conjunction with the continuously changing density of the particle group in the solid electrolyte layers 14 and 24, the present invention is not limited thereto, and the density of the particle group in the solid electrolyte layer may be changed stepwise. For example, the density of the particle group in the solid electrolyte layer may be changed stepwise along the curves showing the density of the particle group in the solid electrolyte layer in FIG. 2. Such a configuration also can reduce variations in temperature distribution in the X-Y plane of the bipolar battery (unit cell).

The density of the particle group is varied in the single solid electrolyte layer 14 or 24 in Embodiment 1 and the modification as described above. In an assembled battery consisting of stacked unit cells (bipolar batteries) as shown in FIG. 1, the density of the particle group may be varied across solid electrolyte layers depending on the position in the stacking direction.

In the bipolar battery of the stacked configuration, the tendency to dissipate heat may vary on the central layer side and on an outer layer side in the stacking direction to cause variations in temperature distribution among unit cells. The variations in temperature distribution in the stacking direction can be reduced by varying the density of the particle group across the solid electrolyte layers depending on the position of the solid electrolyte layer in the stacking direction.

Specifically, the density of the particle group in a solid electrolyte layer located on the central layer side can be set to be lower than the density of the particle group in a solid electrolyte layer located on the outer layer side when they are compared at the corresponding positions in the stacking direction.

It is also possible that the solid electrolyte layer described in Embodiment 1 or the modification is used as a solid electrolyte layer located on the central layer side, and the conventional solid electrolyte layer (solid electrolyte layer including the particle group having a generally uniform density) is used as a solid electrolyte layer located on the outer layer side.

The density of the particle group in the solid electrolyte layer (specifically, the particle diameter or the amount of bounding agent) is varied by taking account of the heat radiation property of the bipolar battery itself in Embodiment 1 and the modification. However, if thermal effects from the outside cause variations in temperature distribution in the X-Y plane, the density of the particle group in the solid electrolyte layer may be varied in view of the thermal effects. This will hereinafter be described particularly.

For example, when a heat source (such as an engine and a motor) is disposed near the bipolar battery, the thermal effects from the heat source may raise the temperature (in other words, reduce the heat radiation) in an area of the bipolar battery that is closer to the heat source as compared with the other areas.

The variations in temperature distribution in the X-Y plane can be prevented by setting the density of the particle group in the area of the solid electrolyte layer that is closer to the heat source lower than the density of the particle group in the other areas. The varying density of the particle group in the solid electrolyte layer can provide the varying current density to reduce the variations in temperature distribution within the bipolar battery (unit cell) as in Embodiment 1.

The density of the particle group in the solid electrolyte layer can be determined in view of the temperature distribution characteristic in the X-Y plane (which is previously predictable) by considering the thermal effects from the heat source.

For example, in addition to the configuration of the solid electrolyte layer described in Embodiment 1, or instead of the configuration of the solid electrolyte layer described in Embodiment 1, the density of the particle group in an area of the solid electrolyte layer that is closer to the heat source (for example, an area closer to the outer portion on one side) can be lower than the density of the particle group in the other areas (for example, an area closer to the outer portion on the other side). This can prevent the variations in temperature distribution in the X-Y plane due to heat production caused by charge and discharge of the bipolar battery and heat production associated with the thermal effects from the outside.

When the temperature is the highest (the heat radiation is the lowest) in an area of the solid electrolyte layer that is closer to the heat source due to the thermal effects from the heat source, the lowest density of the particle group can be set in that area closer to the heat source.

On the other hand, when the heat source is placed in the stacking direction of the assembled battery consisting of stacked unit cells (bipolar batteries) as shown in FIG. 1 and the like, one of the plurality of unit cells that is located closer to the heat source is susceptible to the thermal effects from the heat source. This can be addressed by providing different configurations for the solid electrolyte layer in a unit cell located closer to the heat source and the solid electrolyte layer in a unit cell located opposite to the heat source.

Specifically, the density of the particle group in the solid electrolyte layer(s) located closer to the heat source (at one of the two outermost layers in the stacking direction) can be lower than the density of the particle group in other solid electrolyte layers (for example, the solid electrolyte layer located at the other outermost layer in the stacking direction). In other words, the density of the particle group can be varied among the plurality of solid electrolyte layers in the corresponding areas in the stacking direction.

In this case, the density of the particle group in the solid electrolyte layer located at or near the central layer in the stacking direction and of the solid electrolyte layer located at the outermost layer closer to the heat source can be lower than the density of the particle group in the other solid electrolyte layers, for example. Such a configuration can prevent the variations in temperature distribution in the stacking direction even when the bipolar battery of the stacked structure is subjected to the thermal effects from the heat source.

If the temperature is the highest (in other words, the heat radiation is the lowest) in the unit cell located at the outermost layer closer to the heat source, the lowest density of the particle group can be set in the solid electrolyte layer of that unit cell.

In the abovementioned configuration in which the density of the particle group is varied across the solid electrolyte layers depending on the position in the stacking direction, it is possible to use, as the solid electrolyte layer, only the solid electrolyte layer described in Embodiment 1 or the like, or the conventional solid electrolyte layer (solid electrolyte layer including the particle group having a generally uniform density) in addition to the solid electrolyte layer in Embodiment 1 or the like.

Embodiment 2

Figure 7:
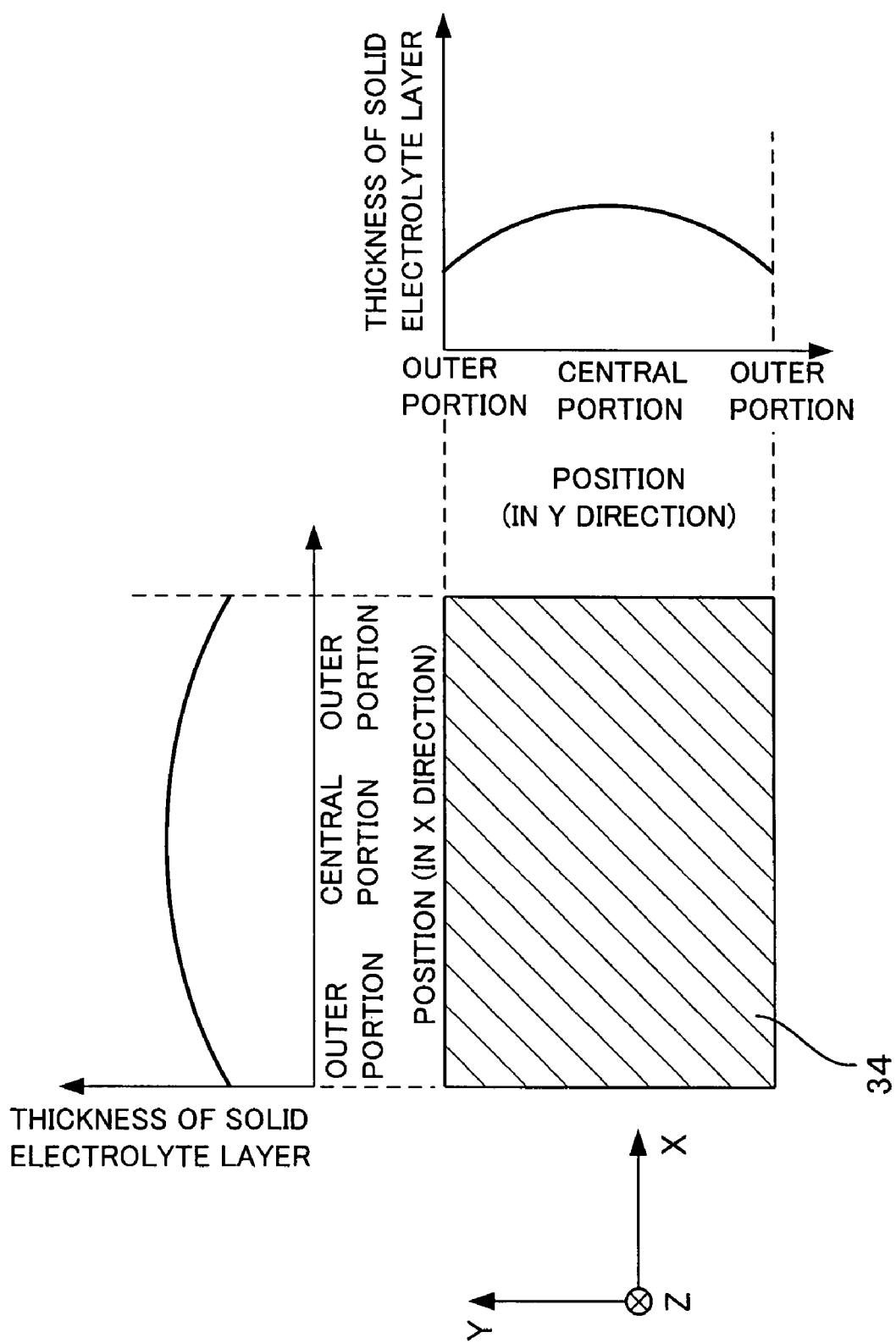
FIG. 7 A front view of a solid electrolyte layer for use in a bipolar battery which is Embodiment 2 of the present invention and graphs showing the relationship between the thickness and the position of the solid electrolyte layer.
Figure 8:
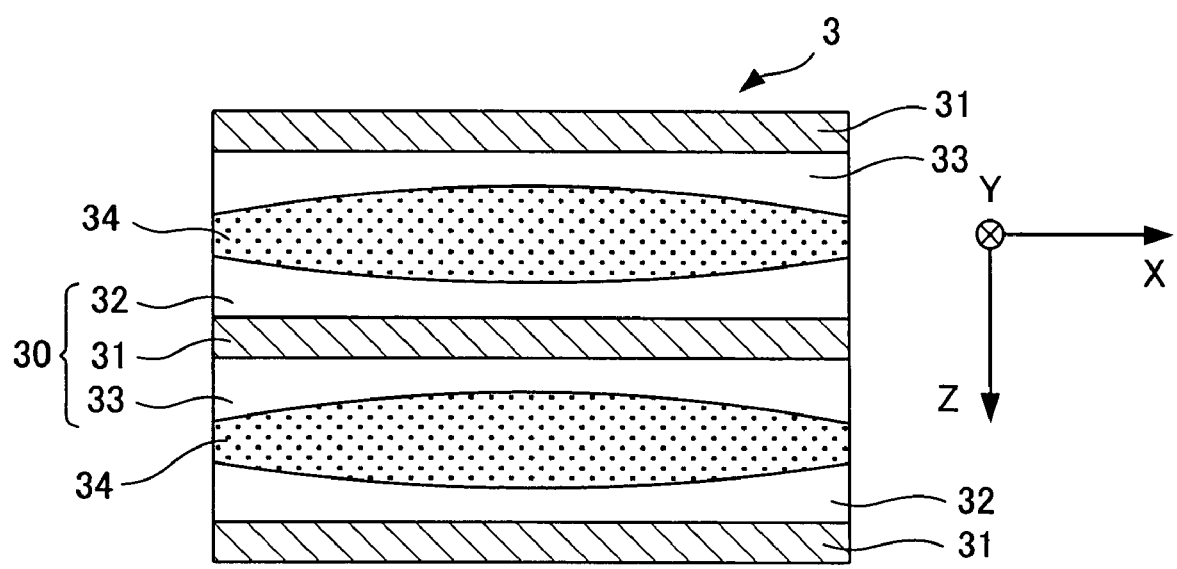
FIG. 8 A side view (schematic diagram) of the bipolar battery of Embodiment 2.

Next, a bipolar battery (secondary battery) which is Embodiment 2 of the present invention will be described with reference to FIGS. 7 and 8. FIG. 7 is a front view of a solid electrolyte layer for use in the bipolar battery of Embodiment 2 and shows the relationship between the thickness and the position of the solid electrolyte layer. FIG. 8 is a side view (schematic diagram) of the bipolar battery of Embodiment 2.

Embodiment 1 has been described for the case where the density of the particle group in the solid electrolyte layer is varied in the X direction and the Y direction. In Embodiment 2, the solid electrolyte layer contains a group of particles at a generally uniform density (including some manufacture errors) and varies in thickness. The following description will mainly focus on differences from Embodiment 1.

In FIG. 7, a solid electrolyte layer 34 has a thickness (length in a Z direction) which is the largest at the center and is continuously reduced toward an outer portion in an X direction. The thickness of the solid electrolyte layer 34 is also the largest at the center and is continuously reduced toward an outer portion in a Y direction. In other words, each of the surfaces of the solid electrolyte layer 34 (surfaces in contact with electrodes layers 32 and 33, later described) has convex shape with a curvature.

On the other hand, a positive electrode layer 32 and a negative electrode layer 33 are formed on surfaces of a collector 31 on both sides. The positive electrode layer 32 has a thickness which is the smallest at the center and is continuously increased toward an outer portion. The negative electrode layer 33 has a thickness which is the smallest at the center and is continuously increased toward an outer portion. This configuration allows two adjacent collectors 31 to be placed at generally regular intervals in a stacking direction (Z direction). Each of the positive electrode layer 32 and the negative electrode layer 33 may have a generally uniform thickness.

As in Embodiment 1, each of the positive electrode layer 32 and the negative electrode layer 33 contains an active material and the like appropriate for the positive electrode or the negative electrode. Each of the positive electrode layer 32 and the negative electrode layer 33 is in contact with the surface of the solid electrolyte layer 34.

As described above, the varying thickness of the solid electrolyte layer 34 can vary the current density in a X-Y plane. When the thickness of the solid electrolyte layer 34 on the central portion side is larger than the thickness on the outer portion side, the resistance is larger and the current value is smaller on the central portion side of the solid electrolyte layer 34.

As described in Embodiment 1, energy consumed as heat is generally proportional to the value of resistance and the square of the current value, so that the energy largely depends on the current value. In the configuration of the solid electrolyte layer 34 of Embodiment 2, the current value is lower on the central portion side as described above. Thus, heat production can be reduced efficiently in the portion with the smaller current value, in other words, on the central portion side of the solid electrolyte layer 34.

The heat production reduced on the central portion side in this manner can prevent variations in temperature distribution in the X-Y plane of a bipolar battery 3.

The thickness of the solid electrolyte layer 34 in Embodiment 2 can be determined on the basis of temperature distribution in a conventional bipolar battery (battery including the solid electrolyte layer with a generally uniform thickness). In other words, as described in Embodiment 1, the thickness of the solid electrolyte layer 34 can be set as appropriate to achieve a generally flat temperature distribution curve in use.

The electrode layers 32 and 33 formed on the substantially entire surface of the collector 31 in Embodiment 2 can increase the effective area which can be used as the electrode as compared with the case where the plurality of minute cells (electrode layers) are formed on the collector as in the secondary battery described in Patent Document 1. In addition, the area of each of the electrode layers 32 and 33 can be increased in size in Embodiment 2 as compared with the minute cells described in Patent Document 1, so that the electrode layers 32 and can be prevented from coming off the collector 31.

The formation of the electrode layers 32 and 33 over the entire surface of the collector 31 can increase the effective area usable as the electrode to improve the energy efficiency of the bipolar battery 3 as compared with the case where the electrode layer is not formed in some areas.

Since the use of the bipolar battery 3 in Embodiment 2 can prevent variations in temperature distribution in the X-Y plane, thermal expansion can be reduced at or near the center. Even when the structure shown in FIG. 4 is used, it is possible to avoid displacement only at or near the center of the bipolar battery 3 due to the thermal expansion.

While Embodiment 2 has been described in conjunction with the continuously varied thickness of the solid electrolyte layer 34 and the electrode layers 32 and 33, the present invention is not limited thereto, and the thickness of the solid electrolyte layer 34 and the electrode layers 32 and 33 may be varied stepwise. For example, the thickness of the solid electrolyte layer 34 may be varied stepwise along the curves showing the thickness of the solid electrolyte layer 34 shown in FIG. 7.

The thickness of the solid electrolyte layer 34 and the electrode layers 32 and 33 may be varied in one of the X and Y directions. In this case, variations in temperature distribution can be prevented in the direction in which the thickness of the solid electrolyte layer 34 and the electrode layers 32 and 33 may be varied.

It is also possible to form one of the surfaces of the solid electrolyte layer 34 to be generally flat and the other surface as a curve surface in which the thickness on the central portion side is larger than the thickness on the outer portion side. In this case, the electrode layer (positive electrode layer or negative electrode layer) in contact with the one surface of the solid electrode layer 34 has a generally uniform thickness. The electrode layer (negative electrode layer or positive electrode layer) in contact with the other surface of the solid electrode layer 34 has the configuration similar to that of the electrode layer 32 and 33 shown in FIG. 8.

The thickness of each of the solid electrolyte layers 34 is varied in the X-Y plane in Embodiment 2. However, in an assembled battery consisting of stacked bipolar batteries 3 (unit cells), the thickness of the solid electrolyte layer 34 may be varied depending on the position in the stacking direction. This also can prevent variations in temperature distribution in the stacking direction.

Specifically, the thickness of a solid electrolyte layer located on the central layer side can be set to be larger than the thickness of a solid electrolyte layer located on an outer layer side when they are compared at the corresponding positions in the stacking direction.

It is also possible that the solid electrolyte layer 34 described in Embodiment 2 is used as a solid electrolyte layer located at or near the central layer, and the conventional solid electrolyte layer (solid electrolyte layer having a generally uniform thickness) is used as a solid electrolyte layer located in the outer layer.

The thickness of the solid electrolyte layer 34 is varied by taking account of the heat radiation property of the bipolar battery itself in Embodiment 2. However, if thermal effects from the outside causes variations in temperature distribution in the X-Y plane, the thickness of the solid electrolyte layer 34 may be varied in view of the thermal effects.

Specifically, as in Embodiment 1, the variations in temperature distribution in the X-Y plane can be prevented by setting the thickness of an area of the solid electrolyte layer 34 that is close to the heat source larger than the thickness of the other areas. The varying thickness of the solid electrolyte layer 34 can provide the varying current density to reduce the variations in temperature distribution within the bipolar battery (unit cell) 3 as in Embodiment 2.

As in Embodiment 1, the thickness of the solid electrolyte layer located at or near the central layer in the stacking direction and the thickness of the solid electrolyte layer located at the outermost layer closer to the heat source can be larger than the thickness of the other solid electrolyte layers. Such a configuration can avoid the variations in temperature distribution in the stacking direction even when the bipolar battery of the stacked structure is subjected to the thermal effects from the heat source.

In addition, as in the modification (FIGS. 5 and 6) of Embodiment 1, it is possible to provide the area (some areas) in which the electrode layer 32 or 33 or the solid electrolyte layer 34 is not formed.

Embodiment 3

Next, a bipolar battery (secondary battery) which is Embodiment 3 of the present invention will be described. In Embodiment 3, groups of particles constituting a solid electrolyte layer are made of different materials to prevent variations in temperature distribution within the bipolar battery.

Since the configuration of the bipolar battery of Embodiment 3 is similar to the configuration (FIG. 1) of the bipolar battery described in Embodiment 1, members identical to those described in Embodiment 1 are described with the same reference numerals. The following description will focus on differences from Embodiment 1.

The solid electrolyte layer 14 contains a plurality of types of particles made of different materials and a bounding agent for bounding the particles. The solid electrolyte layer 14 is formed to have a lower current density on the central portion side than that on an outer portion side.

Specifically, a group of particles located on the central portion side of the solid electrolyte layer 14 can be formed of a group of particles having a higher resistance value than that of a group of particles located on the outer portion side. Specifically, the resistance value can be varied by using particles having different levels of ion conduction or by using particles covered with a coating.

Specific examples of the materials of the particles constituting the solid electrolyte layer and of the levels of ion conduction include $Li_2O$—$B_2O_3$; $10^{-7}$ [S/cm], $Li_2O_2$—$SiO_2$; $10^{-6}$ [S/cm], $Li_2S$—$GeS_4$; $10^{-5}$ [S/cm], $Li_2S$—$P_2S_5$; $10^{-4}$ [S/cm], $LiI$—$Li_2S$—$P_2S_5$; $10^{-3}$ [S/cm].

When the particles made of different materials are used, materials may be varied or a plurality of materials are mixed at changing ratios depending on the position in the solid electrolyte layer.

On the other hand, when the surface of the particle has a coating thereon, the level of ion conduction can be increased or reduced depending on the material of the coating. When the particles of different types (particles having coatings made of different materials) are used, the type of particles may be varied or a plurality of types of particles may be mixed at changing ratios depending on the position in the solid electrolyte layer.

The particles with no coating and the coated particles may be used in combination.

In this manner, the particles of different types are used to provide different resistance values in the solid electrolyte layer, so that the current density can be varied in the bipolar battery to prevent variations in temperature distribution in the bipolar battery (unit cell). Specifically, heat production at or near the central portion of the bipolar battery can be reduced to prevent variations in temperature distribution.

On the other hand, in an assembled battery consisting of stacked bipolar batteries (unit cells), the configuration (type of particles) of the solid electrolyte layer may be varied depending on the position of the solid electrolyte layer in the stacking direction. For example, the resistance of a solid electrolyte layer located on the central layer side can be set to be larger than the resistance of a solid electrolyte layer located on an outer layer side when they are compared at the corresponding positions in the stacking direction. This also can prevent variations in temperature distribution in the stacking direction.

In Embodiment 3, the solid electrolyte layer has a generally uniform thickness and includes the different types of particles therein. However, the thickness of the solid electrolyte layer may be varied as in Embodiment 2 with the different types of particles maintained. In this case, the two parameters of the type of particles and the thickness of the solid electrolyte layer can be set appropriately to prevent variations in temperature distribution in the bipolar battery (unit cell).

In addition, as in Embodiments 1 and 2, if thermal effects from the outside cause variations in temperature distribution in the X-Y plane, the type of particles in the solid electrolyte layer may be varied in view of the thermal effects.

Specifically, the type of particles can be selected appropriately such that the resistance in an area of the solid electrolyte layer that is close to a heat source is larger than the resistance in other areas, thereby preventing variations in temperature distribution within the X-Y plane.

As in Embodiment 1, the resistance in the solid electrolyte layer located at or near the central layer in the stacking direction and the resistance of the solid electrolyte layer located at the outermost layer closer to the heat source can be lower than the resistance in the other solid electrolyte layers. Such a configuration can prevent variations in temperature distribution in the stacking direction even when the bipolar battery of the stacked structure is subjected to the thermal effects from the heat source.

While Embodiments 1 to 3 have been described for the configuration in which the plurality of bipolar electrodes are stacked with the solid electrolyte layer interposed between them, the present invention is not limited thereto. For example, the present invention is applicable to a configuration including wound bipolar electrodes.

For example, when the density of the particle group in the solid electrolyte layer is varied as in Embodiment 1, the wound solid electrolyte layer can be divided into a plurality of areas from the end located at the center to the end located in an outer layer and the density of the particle group can be varied across the areas. Specifically, the density of the particle group can be reduced toward the center.

In this case, the current density in the area on the center side is lower than the current density in the area in the outer layer. This can prevent variations in temperature distribution in the stacking direction of the bipolar electrode (in other words, in the diameter direction of the cylindrical shape).

The configuration described in Embodiment 3 may be applied to a battery of the type including wound electrodes, in the same manner as the case where density of the particle group is varied.

The secondary battery described in each of Embodiments 1 to 3 can be used as a power storage device for driving a motor in an electric vehicle (EV), a hybrid electric vehicle (HEV), and a fuel cell vehicle (FCV), for example.

The invention claimed is:

1. A power storage device comprising:
a positive electrode and a negative electrode; and
a solid electrolyte layer placed between the positive electrode and the negative electrode and including a group of particles,
wherein a density of particles per volume in a first area of the solid electrolyte layer is lower than a density of particles per volume in a second area which has higher heat radiation than the first area such that current value is lower, and resistance higher, in the first area than in the second area, in order to reduce heat production in the first area, and to prevent variation in temperature distribution in a predetermined direction in the power storage device, the predetermined direction being a direction orthogonal to a stacking direction of the positive electrode, the negative electrode and the solid electrolyte layer,
wherein the first area is an area located in the predetermined direction on a central portion side of the solid electrolyte layer, and the second area is an area located in the predetermined direction closer to an end portion than the first area.

2. The power storage device according to claim 1, wherein an average diameter of the particles in the first area is larger than an average diameter of the particles in the second area.

3. The power storage device according to claim 1, wherein the solid electrolyte layer includes a bonding agent for bonding the particles, and
an amount of the bonding agent in the first area is larger than an amount of the bonding agent in the second area.

4. The power storage device according to claim 3, wherein an average diameter of the particles in the first area is generally equal to an average diameter of the particles in the second area.

5. The power storage device according to claim 1, wherein a density of the particles is reduced from the end position to the central portion of the solid electrolyte layer continuously or stepwise.

6. A power storage device comprising:
a positive electrode and a negative electrode; and
a solid electrolyte layer placed between the positive electrode and the negative electrode and including a group of particles,
wherein a thickness of a first area of the solid electrolyte layer is larger than a thickness of a second area which has higher heat radiation than the first area such that current value is lower, and resistance higher, in the first area than in the second area, in order to reduce heat production in the first area, and to prevent variation in temperature distribution in a predetermined direction in the power storage device, the predetermined direction being a direction orthogonal to a stacking direction of the positive electrode, the negative electrode and the solid electrolyte layer,
wherein the first area is an area located in the predetermined direction on a central portion side of the solid electrolyte layer, and the second area is an area located in the predetermined direction closer to an end portion than the first area.

7. The power storage device according to claim 6, wherein a thickness of an area of each of the positive electrode and the negative electrode that corresponds to the first area is smaller than a thickness of an area corresponding to the second area.

8. A power storage device comprising:
a positive electrode and a negative electrode; and
a solid electrolyte layer placed between the positive electrode and the negative electrode and including a group of particles,
wherein a material of the particles in a first area of the solid electrolyte layer is different from a material of the particles in a second area which has higher heat radiation than the first area such that current value is lower, and resistance higher, of the particles forming the first area than of the particles forming the second area, in order to reduce heat production in the first area, and to prevent variation in temperature distribution in a predetermined direction in the power storage device, the predetermined direction being a direction orthogonal to a stacking direction of the positive electrode, the negative electrode and the solid electrolyte layer,
wherein the first area is an area located in the predetermined direction on a central portion side of the solid electrolyte layer, and the second area is an area located in the predetermined direction closer to an end portion than the first area.

9. A power storage device comprising:
a positive electrode and a negative electrode; and
a solid electrolyte layer placed between the positive electrode and the negative electrode and including a group of particles,
wherein a density of particles per volume in a first area of the solid electrolyte layer is lower than a density of particles per volume in a second area which has higher heat radiation than the first area such that current value is lower, and resistance higher, in the first area than in the second area, in order to reduce heat production in the first area, and to prevent variation in temperature distribution in a predetermined direction in the power storage device, the predetermined direction being a direction orthogonal to a stacking direction of the positive electrode, the negative electrode and the solid electrolyte layer,
wherein the power storage device is disposed adjacent to a heat source in the predetermined direction, wherein the first area is an area located in a predetermined direction closest to the heat source, and the second area is an area located in the predetermined direction away from the heat source than the first area.

10. A power storage device comprising:

a positive electrode and a negative electrode; and a solid electrolyte layer placed between the positive electrode and the negative electrode and including a group of particles, wherein a thickness of a first area of the solid electrolyte layer is larger than a thickness of a second area which has higher heat radiation than the first area such that current value is lower, and resistance higher, in the first area than in the second area, in order to reduce heat production in the first area, and to prevent variation in temperature distribution in a predetermined direction in the power storage device, the predetermined direction being a direction orthogonal to a stacking direction of the positive electrode, the negative electrode and the solid electrolyte layer, wherein the power storage device is disposed adjacent to a heat source in the predetermined direction, wherein the first area is an area located in the predetermined direction closest to the heat source, and the second area is an area located in the predetermined direction away from the heat source than the first area.

11. A power storage device comprising:

a positive electrode and a negative electrode; and a solid electrolyte layer placed between the positive electrode and the negative electrode and including a group of particles, wherein a material of the particles in a first area of the solid electrolyte layer is different from a material of the particles in a second area which has higher heat radiation than the first area such that current value is lower, and resistance higher, of the particles forming the first area than of the particles forming the second area, in order to reduce heat production in the first area, and to prevent variation in temperature distribution in a predetermined direction in the power storage device, the predetermined direction being a direction orthogonal to a stacking direction of the positive electrode, the negative electrode and the solid electrolyte layer, wherein the power storage device is disposed adjacent to a heat source in the predetermined direction, wherein the first area is an area located in the predetermined direction closest to the heat source, and the second area is an area located in the predetermined direction away from the heat source than the first area.

* * * * *

UNITED STATES PATENT AND TRADEMARK OFFICE
CERTIFICATE OF CORRECTION

PATENT NO.        : 7,803,486 B2                                    Page 1 of 1
APPLICATION NO.   : 12/085024
DATED             : September 28, 2010
INVENTOR(S)       : Yoshiyuki Nakamura It is certified that error appears in the above-identified patent and that said Letters Patent is hereby corrected as shown below:

| Column | Line | |
|--------|------|---|
| 5      | 38   | After "electrolyte layer" insert --14--. |

Signed and Sealed this
Twenty-second Day of March, 2011

David J. Kappos
*Director of the United States Patent and Trademark Office*